United States Patent
Lo et al.

(10) Patent No.: US 10,418,919 B2
(45) Date of Patent: Sep. 17, 2019

(54) ELECTRIC TOOL AND MOTOR DRIVE SYSTEM

(71) Applicant: JOHNSON ELECTRIC INTERNATIONAL AG, Murten (CH)

(72) Inventors: Yuk Tung Lo, Hong Kong (CN); Hai Bo Ma, Hong Kong (CN); Song Chen, Shenzhen (CN); Siu Chung Yip, Hong Kong (CN); Yong Sheng Gao, Shenzhen (CN); Jian Xun Zou, Shenzhen (CN)

(73) Assignee: Johnson Electric International AG, Murten (CH)

( * ) Notice: Subject to any disclaimer, the term of this patent is extended or adjusted under 35 U.S.C. 154(b) by 0 days.

(21) Appl. No.: 15/282,720

(22) Filed: Sep. 30, 2016

(65) Prior Publication Data

US 2017/0093308 A1    Mar. 30, 2017

(30) Foreign Application Priority Data

Sep. 30, 2015   (CN) .......................... 2015 1 0641142

(51) Int. Cl.
  B25F 5/00   (2006.01)
  H02P 3/18   (2006.01)

(52) U.S. Cl.
  CPC . H02P 3/18 (2013.01); B25F 5/00 (2013.01)

(58) Field of Classification Search
  CPC ............ G06K 19/06206; G07F 7/0833; G07F 7/0853; G06Q 20/3415; G06Q 20/3572
  See application file for complete search history.

(56) References Cited

U.S. PATENT DOCUMENTS

| | | | |
|---|---|---|---|
| 6,234,155 B1 * | 5/2001 | Brothers | F02B 43/10 |
| | | | 123/586 |
| 2005/0220445 A1 * | 10/2005 | Baskar | B25C 1/06 |
| | | | 388/811 |

(Continued)

FOREIGN PATENT DOCUMENTS

| | | |
|---|---|---|
| CN | 101051756 A | 10/2007 |
| CN | 202177791 U | 3/2012 |

(Continued)

OTHER PUBLICATIONS

A European Search Report from corresponding Application No. 16188403.6 dated Feb. 7, 2017 is attached.

*Primary Examiner* — Shawki S Ismail
*Assistant Examiner* — Zoheb S Imtiaz
(74) *Attorney, Agent, or Firm* — Muncy, Geissler, Olds & Lowe, P.C.

(57) ABSTRACT

An electric tool and a motor drive system are provided. The motor drive system includes a trigger switch, an electronic switch, and a switch control circuit connected between the trigger switch and the electronic switch. The trigger switch is connected in series to a power supply. The electronic switch is configured to control a motor to be powered on or powered off. The switch control circuit is configured to control the electronic switch based on a state of the trigger switch, wherein the electronic switch is delayed to be turned off after the trigger switch is turned off to control the motor to be powered off later than a time that the trigger switch is turned off.

15 Claims, 4 Drawing Sheets

(56) References Cited

U.S. PATENT DOCUMENTS

| | | | | |
|---|---|---|---|---|
| 2008/0059000 A1* | 3/2008 | Hornick | ............... | H02J 7/0031 |
| | | | | 700/297 |
| 2010/0117581 A1* | 5/2010 | Miwa | ................... | H02P 29/032 |
| | | | | 318/472 |
| 2012/0279736 A1* | 11/2012 | Tanimoto | ............... | B25B 21/02 |
| | | | | 173/2 |
| 2013/0082632 A1* | 4/2013 | Kusakawa | ............. | B25B 21/00 |
| | | | | 318/477 |
| 2015/0137717 A1* | 5/2015 | Ishikawa | .................. | B25F 5/00 |
| | | | | 318/379 |

FOREIGN PATENT DOCUMENTS

| | | |
|---|---|---|
| CN | 104660121 A | 5/2015 |
| EP | 2 140 983 A2 | 1/2010 |
| EP | 2 674 261 A1 | 12/2013 |
| EP | 2 713 474 A2 | 4/2014 |
| WO | WO 2012/096198 A2 | 7/2012 |
| WO | WO 2012/014128 A1 | 1/2014 |
| WO | WO 2015/025677 A1 | 2/2015 |

* cited by examiner

ELECTRIC TOOL AND MOTOR DRIVE SYSTEM

CROSS REFERENCE TO RELATED APPLICATIONS

This non-provisional patent application claims priority under 35 U.S.C. § 119(a) from Patent Application No. CN201510641142.0 filed in The People's Republic of China on Sep. 30, 2015.

TECHNICAL FIELD

The present disclosure relates to an electric tool, and in particular to a motor drive system applicable to the electric tool.

BACKGROUND

In people's production and life, different electric tools are usually needed to complete various tasks. For example, an electric saw is used to perform tasks such as forest harvesting, bucking, branching and wood cutting, an electric drill is used to drill holes, an electric screwdriver is used to tighten or remove screws, and a hand mill is used to perform edging, trimming and polishing on glass and resin. Electric tools are easy to operate and are laborsaving.

FIG. 1 shows a drive circuit for an electric tool in the conventional technology. A trigger switch 90 is needed in the electric tool in the conventional technology to control the electric tool to operate or not. The trigger switch 90 is connected between a power supply 92 and an inverter 94 of the electric tool. When the trigger switch 90 is turned on, the electric tool is in operation, and a drive control circuit 93 outputs a drive signal based on a position of a magnetic field of a rotor detected by a position sensor 99, to control the inverter 94 to convert electrical power of the power supply 92 into alternating current power which is supplied to a motor 95, so that the motor 95 drives a working head of the electric tool to operate. Since the trigger switch 90 is connected between the power supply 92 and the inverter 94 of the electric tool, the trigger switch 90 is required to have a very high rated current. For example, in an electric drill, the rated current may be up to about 10 amperes. In practice, a trigger switch that can withstand a high current is expensive, which increases the cost of the electric tool.

SUMMARY

An electric tool and a motor drive system for the electric tool are provided according to the present disclosure to reduce the cost.

A motor drive system is provided according to an embodiment in the present disclosure. The motor drive system includes:
  an inverter coupled to a power supply comprising a plurality of semiconductor switch elements and configured to convert a voltage provided by the power supply into alternating current power to power an electric motor;
  a motor drive control circuit configured to output a drive signal to control a power mode of the semiconductor switch elements in the inverter;
  a trigger switch;
  an electronic switch connected between the power supply and the motor drive control circuit; and
  a switch control circuit coupled to the trigger switch and the electronic switch and configured to turn on or turn off the electronic switch based on a state of the trigger switch.

Preferably, the switch control circuit comprises a delay unit connected between the electronic switch and the trigger switch and configured to delay to turn off the electronic switch for a delay time since the trigger switch is turned off.

Preferably, the motor drive control circuit comprises a microcontroller configured to detect the state of the trigger switch and control the motor to brake during the delay time.

Preferably, the electronic switch is a first electronic switch, the switch control circuit further comprises a second electronic switch, and a diode, and a control terminal of the second electronic switch is coupled to a cathode of the diode through the delay unit, an anode of the diode is coupled to the power supply through the trigger switch, a first terminal of the second electronic switch is coupled to a control terminal of the first electronic switch through a first resistor, the control terminal of the first electronic switch is coupled to the power supply through a second resistor, a first terminal of the first electronic switch is coupled to the power supply, a second terminal of the first electronic switch is coupled to the motor drive control circuit, and the control terminal of the second electronic switch is coupled to the second terminal of the second electronic switch through a third resistor.

Preferably, the delay unit comprises a capacitor and a fourth resistor, the fourth resistor is connected between the cathode of the diode and the control terminal of the second electronic switch, and the capacitor is connected between the cathode of the diode and ground.

Preferably, a rated current of the trigger switch is lower than 100 milliamperes.

Preferably, the motor drive control circuit comprises a microcontroller which is configured to detect an operation of the trigger switch and control, after learning that the trigger switch is turned off, the motor to perform a braking operation and is configured to send, after the braking operation of the motor is completed, a control signal to the switch control circuit to turn off the electronic switch.

Preferably, the electronic switch is a first electronic switch, the switch control circuit comprises a second electronic switch, a first diode and a second diode; and a control terminal of the second electronic switch is coupled to a cathode of the first diode through a first resistor, an anode of the first diode is coupled to the power supply through the trigger switch, a first terminal of the second electronic switch is coupled to a control terminal of the first electronic switch through a second resistor, the control terminal of the first electronic switch is coupled to a first terminal of the first electronic switch through a third resistor, the first terminal of the first electronic switch is coupled to the power supply, a second terminal of the first electronic switch is coupled to the motor drive control circuit, a second terminal of the second electronic switch is coupled to the ground, the control terminal of the second electronic switch is coupled to the second terminal of the second electronic switch through a fourth resistor, a cathode of the second diode is coupled to the cathode of the first diode, and an anode of the second diode is coupled to the microcontroller.

Preferably, the switch control circuit comprises a capacitor connected between the control terminal of the second electronic switch and the ground.

Preferably, the microcontroller is configured to:
  send, after the trigger switch is turned on, a high-level control signal to the anode of the second diode to control the switch control circuit to keep the first electronic switch being turned on;

continue to send the high-level control signal to the anode of the second diode after learning that the trigger switch is turned off; and send, after the braking operation of the motor is completed, a low-level control signal to the anode of the second diode to control the switch control circuit to turn off the first electronic switch.

A motor drive system is further provided according to an embodiment in the present disclosure, which includes a trigger switch, an electronic switch, and a switch control circuit connected between the trigger switch and the electronic switch. The trigger switch is connected in series to a power supply. The electronic switch is configured to control a motor to be powered on or powered off; and the switch control circuit is configured to control the electronic switch based on a state of the trigger switch, wherein the electronic switch is delayed to be turned off after the trigger switch is turned off to control the motor to be powered off later than a time that the trigger switch is turned off.

Preferably, the trigger switch and the motor are arranged in two different current branches respectively, and a current flowing through the trigger switch is lower than an operating current of the motor while the motor drive system is powered to operate.

Preferably, the current flowing through the trigger switch is lower than one percent of the operating current of the motor while the motor drive system is powered to operate.

Preferably, the motor drive system further comprises a microcontroller, and the electronic switch is connected in series between the power supply and the microcontroller.

Preferably, the trigger switch is a switch operable by a user manually.

An electric tool is further provided according to an embodiment in the present disclosure, which includes a housing, a working head extending out from the housing, a motor for driving the working head, and the motor drive system as any one described above.

Preferably, the electric tool is one of an electric drill, an electric screwdriver, a hand mill and an electric saw.

In the above electric tool, a trigger switch and the motor are arranged in two different current switches respectively, and the trigger switch is not connected between the power supply and the inverter. In this way, a current flowing through the trigger switch is greatly reduced, and the electric tool does not need to include an expensive high-current trigger switch, so that the cost is low. In addition, a supply path between the power supply and the motor drive control circuit is cut off after delaying for a delay time from a time that the trigger switch is turned off, and a braking operation is completed by the motor in the delay time, which can effectively protect the motor.

DETAILED DESCRIPTION OF THE EMBODIMENTS

Figure 1:
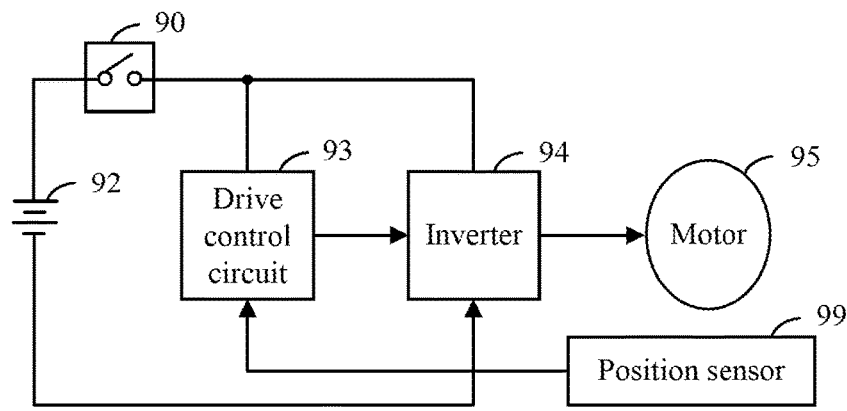
FIG. 1 is a schematic diagram of a drive circuit for an electric tool in the conventional technology.

Embodiments in the present disclosure are described in detail hereinafter in conjunction with drawing, so as to make the technical solutions and other advantageous effect in the present disclosure clearer. It can be understood that the drawings are only provided for reference and illustration without limiting the present disclosure. Sizes shown in the drawings are only for clear description and do not limit the scaling relation.

Figure 2:
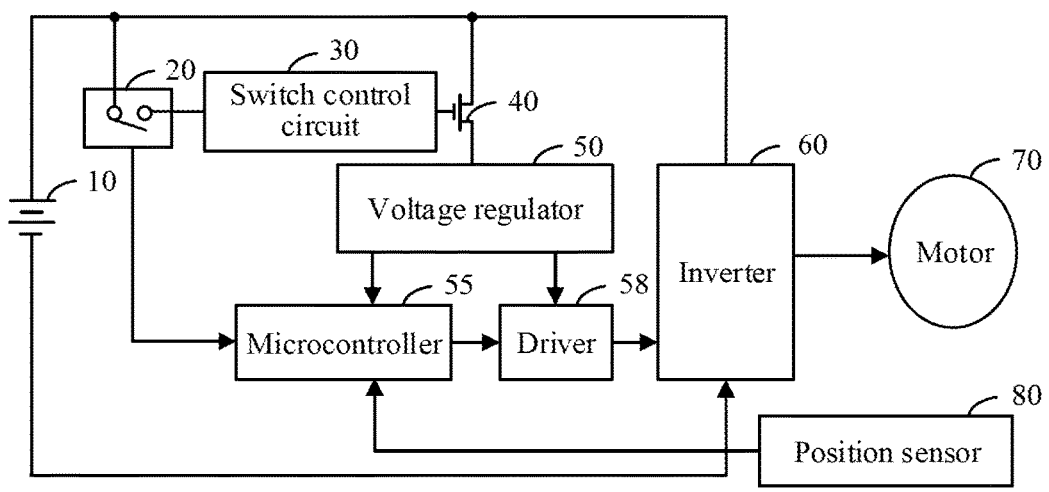
FIG. 2 is a schematic diagram of a motor drive system according to an embodiment in the present disclosure.

As shown in FIG. 2, a motor drive system according to the present disclosure is configured to drive a motor 70 to operate. In the embodiment, the motor 70 is a brushless direct current motor (BLDC) which includes a stator and a rotor rotatable in relative to the stator. The stator includes a stator core and a stator winding wound on the stator core. The stator core may be made of a soft magnetic material, such as pure iron, cast iron, cast steel, electrical steel, silicon steel. The rotor includes a permanent magnet and a cooling fan.

A power supply 10 provides power for the motor 70. In the embodiment, the power supply 10 is a lithium-ion battery. In other embodiments, the power supply may be other types of batteries, such as a nickel metal hydride battery, a lithium polymer battery, a fuel cell and a solar cell. The power supply 10 may also be a rechargeable battery. The power supply is removably arranged in an electric tool provided with the motor 70.

The motor drive system includes a trigger switch 20, a switch control circuit 30, an electronic switch 40, a motor drive control circuit, an inverter 60 and a position sensor 80. The motor drive control circuit includes a voltage regulator 50, a microcontroller 55 and a driver 58, and is configured to output a drive signal to control a power mode of the inverter 60.

The trigger switch 20 is connected between the power supply 10 and the switch control circuit 30. The trigger switch 20 is turned on in a case that the motor 70 is required to operate, and the trigger switch 20 is turned off in a case that the motor 70 is required to stop operating.

The electronic switch 40 is connected between the power supply 10 and the voltage regulator 50, and is configured to control a supply path between the power supply 10 and the voltage regulator 50 to be turned on or turned off. The voltage regulator 50 is connected to the microcontroller 55 and the driver 58, and is configured to reduce a voltage provided by the power supply 10 to a voltage of 5 volts and a voltage of 12 volts. The voltage of 5 volts is provided for the microcontroller 55, and the voltage of 12 volts is provided for the driver 58. In other embodiments, the voltage regulator 50 may regulate the voltage of the power supply 10 into other voltages of different magnitudes based on requirements of electronic elements in different motors. If the voltage provided by the power supply 10 can directly drive the microcontroller 55 and the driver 58, the voltage regulator 50 may not be provided.

The driver 58 is configured to perform voltage boosting or current amplifying on the drive signal outputted by the microcontroller 55 and then transmits the processed signal to the inverter 60. The driver 58 may be a gate driver. It should be understood that if the drive signal outputted by the microcontroller 55 is high enough to drive semiconductor switch elements of the inverter 60, the driver 58 may not be provided.

The driver 58 is connected between the microcontroller 55 and the inverter 60. The inverter 60 is directly connected across the power supply 10 and is connected to the motor 70. The inverter 60 may be a three-phase inverter, which includes multiple, for example, six semiconductor switch elements. The position sensor 80 may be preferably a Hall-effect sensor which is arranged on the stator or arranged at a location near the rotor, and is configured to detect a position of a magnetic pole of the rotor. It should be understood that, as an alternative, the position of the magnetic pole of the rotor may be detected in a sensorless way. The microcontroller 55 outputs, based on the position of the magnetic pole of the rotor detected by position sensor 80, a PWM drive signal to control the semiconductor switch elements in the inverter 60 to be turned on or turned off, so as to control a power mode of motor 70 to commutate the motor and/or control the speed of the motor.

It can be seen from the above description that, since the inverter 60 is always connected across the power supply 10, the motor 70 can be turned on or turned off by simply controlling the supply path between the motor drive control circuit and the power supply 10 to be turned on or turned off. When the voltage regulator 50 of the drive control circuit is powered to operate, the motor drive system drives the motor 70 to operate, and the motor 70 drives a working head of the electric tool hosting the motor to operate. The switch control circuit 30 is connected to the power supply 10 through the trigger switch 20 and control, based on a turn-on or turn-off action of the trigger switch 20, the electric switch 40 to be turned on or turned off, and thereby controlling an operation state of the entire motor drive system.

Figure 3:
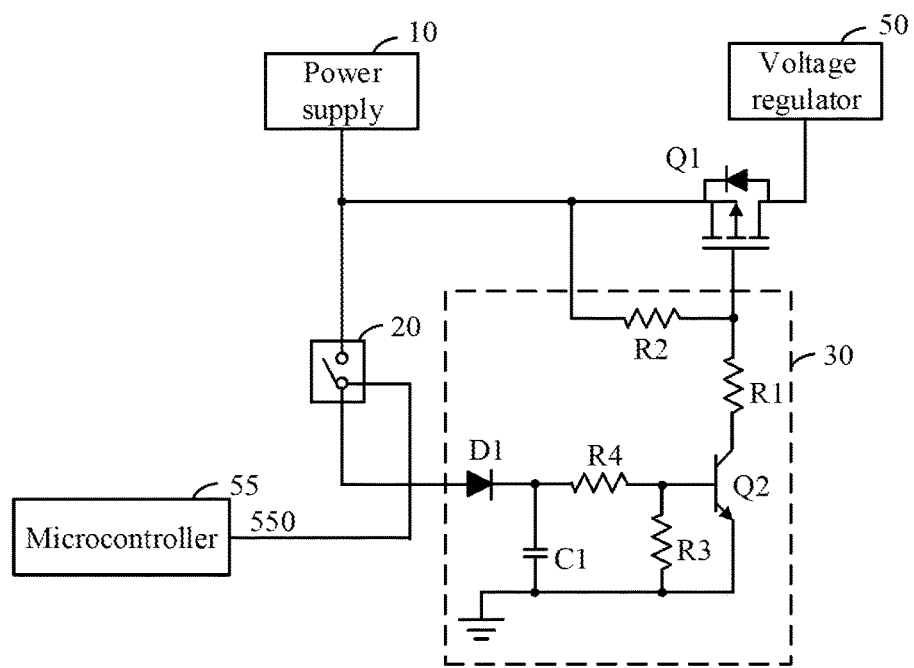
FIG. 3 is a specific circuit diagram of a switch control circuit connected to a microcontroller, a power supply and a voltage regulator as shown in FIG. 2.

As shown in FIG. 3, the switch control circuit 30 includes a triode Q2, resistors R1 to R4 and a diode D1. An anode of the diode D1 is connected to the power supply 10 through the trigger switch 20, and a cathode of the diode D1 is connected to the ground through a capacitor C1 and is also connected to a base of the triode Q2 through the resistor R4. The base of the triode Q2 is also connected to an emitter of the triode Q2 through the resistor R3. A collector of the triode Q2 is connected to the power supply 10 through the resistor R1 and the resistor R2 which are connected in series, and a node between the resistor R1 and the resistor R2 is connected to a control terminal of the electronic switch 40. In the embodiment, the electronic switch 40 is a p-channel metal-oxide-semiconductor field-effect transistor (MOSFET) Q1, which has a gate serving as the control terminal of the electronic switch 40 and connected to the node between the resistor R1 and the resistor R2, a source serving as a first terminal of the electronic switch 40 and connected to the power supply 10, and a drain serving as a second terminal of the electronic switch 40 and connected to the voltage regulator 50. In other embodiments, the first electronic switch 40 may be a PNP triode having a base, an emitter and a collector which serves as the control terminal, the first terminal and the second terminal of the electronic switch 40 respectively. In the embodiment, the triode Q2 also serves as an electronic switch element. In other embodiments, the triode Q2 may be replaced by a MOSFET element.

An external switch pin 550 of the microcontroller 55 is connected to the trigger switch 20. When the microcontroller 55 is powered to operate, an operation of the trigger switch 20 is read in a real-time manner. In an example, when the trigger switch 20 is turned on, the external switch pin 550 receives a high-level signal; and when the trigger switch 20 is turned off, the external switch pin 550 receives a low-level signal. The microcontroller 55 controls, after learning that the trigger switch 20 is turned off, the motor 70 to perform a braking operation.

An operating principle of the motor drive system is described below.

Before the trigger switch 20 is pressed, i.e., when the trigger switch 20 is in an off-state, the triode Q2 is in an off-state, a voltage at the node between the resistor R1 and the resistor R2 is equal to a voltage of the power supply 10, the MOSFET Q1 is in an off-state, no power supply is provided for the voltage regulator 50, and the motor 70 does not operate.

When the trigger switch 20 is pressed, a current provided by the power supply 10 will charge the capacitor C1 in the switch control circuit 30. When a voltage across the capacitor C1 reaches a turn-on voltage for the triode Q2, the triode Q2 is turned on, and the current provided by the power supply 10 flows through the resistor R2 and the resistor R1 and generates a voltage drop at the node between the resistor R2 and the resistor R1. Therefore, the MOSFET Q1 is turned on, and the power supply 10 provides power for the voltage regulator 50 through the MOSFET Q1. As described above, the motor drive system is in operation, and the motor 70 drives, under the drive of the microcontroller 55, the working head of the electric tool to operate. In this case, the external switch pin 550 of the microcontroller 55 reads the operation of the trigger switch 20 in a real-time manner.

When the trigger switch 20 is turned off, because the capacitor C1 will discharge and the voltage across the capacitor C1 will drop below a pre-set value such as 0.7 volts after a delay time since the trigger switch 20 is turned off, the MOSFET Q1 will not be turned off immediately but maintain the on-state during the time that the voltage across the capacitor C1 is higher than the pre-set value. The microcontroller 55, when learning the turn-off operation of the trigger switch 20, sends the drive signal to the inverter 60 through the driver 58 to control the motor 70 to perform the braking operation. During braking, the motor itself generates electromagnetic torque which has a direction opposite to a rotation direction of the motor, and the motor absorbs mechanical energy from the working head, converts the mechanical energy into electrical energy and consumes the electrical energy in the internal of the motor, to stop rotation of the motor as soon as possible. In an example, it only takes the motor 70 0.3 seconds to brake. The capacitor C1 and the resistor R4 constitutes a delay circuit. A delay time of the delay circuit is with respect to a resistance value of the resistor R4 and a capacitance value of the capacitor C1. That is, by adjusting the values of the capacitor C1 and the resistor R4, the MOSFET Q1 can be turned off after delaying for a delay time of 0.3 seconds from a time that the trigger switch 20 is turned off, and the microcontroller 55 is ensured to complete the braking operation of the motor in the delay time. In other embodiments, the delay time of the delay circuit may be adjusted accordingly based on different requirements of products to which the motor is applied. When the voltage across the capacitor C1 is lower than the turn-on voltage of the triode Q2, the triode Q2 is turned off and then controls the MOSFET Q1 to be turned off, so that a connection path between the voltage regulator 50 and the power supply 10 is turned off, and therefore the motor 70 stops operating.

In the embodiment, the diode D1 is a unidirectional element, which can avoid a discharge current flowing through the trigger switch 20 to the microcontroller 55 when the capacitor C1 is discharging, so as to protect the microcontroller 55.

In a case that the embodiment is applied to an electric drill, when the trigger switch 20 is turned off, the motor completes the braking operation during the delay time, which effectively protects the motor. In addition, since the trigger switch 20 is not connected between the power supply 10 and the inverter 60, a current flowing through the trigger switch 20 when the motor is turned on or turned off is greatly reduced to tens of milliamperes, while an operating current of the motor reaches tens of amperes. That is, the current flowing through the trigger switch 20 is lower than 1/100 of the operating current of the motor. Therefore, there is no need to use an expensive high-current trigger switch, instead, a trigger switch having a rated current lower than 100 milliamperes can be selected, which has a low cost.

Figure 4:
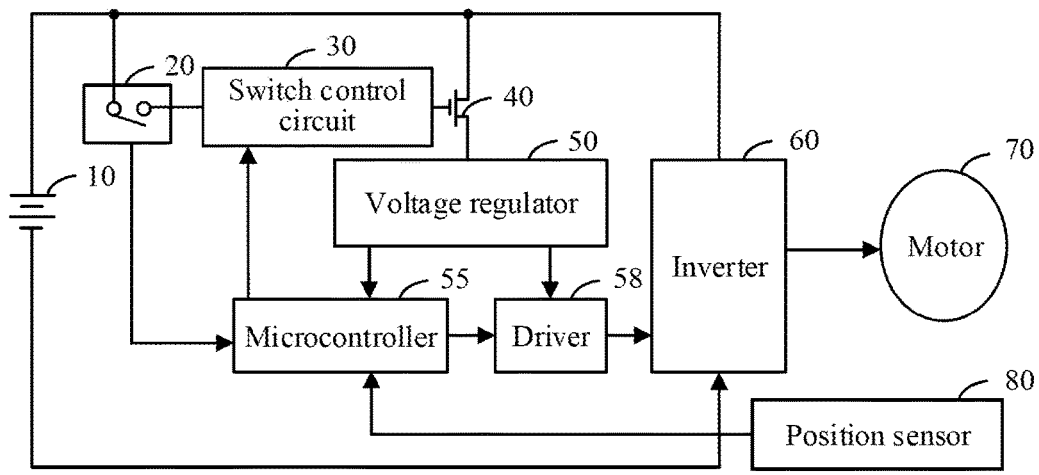
FIG. 4 is a schematic diagram of a motor drive system according to another embodiment in the present disclosure.
Figure 5:
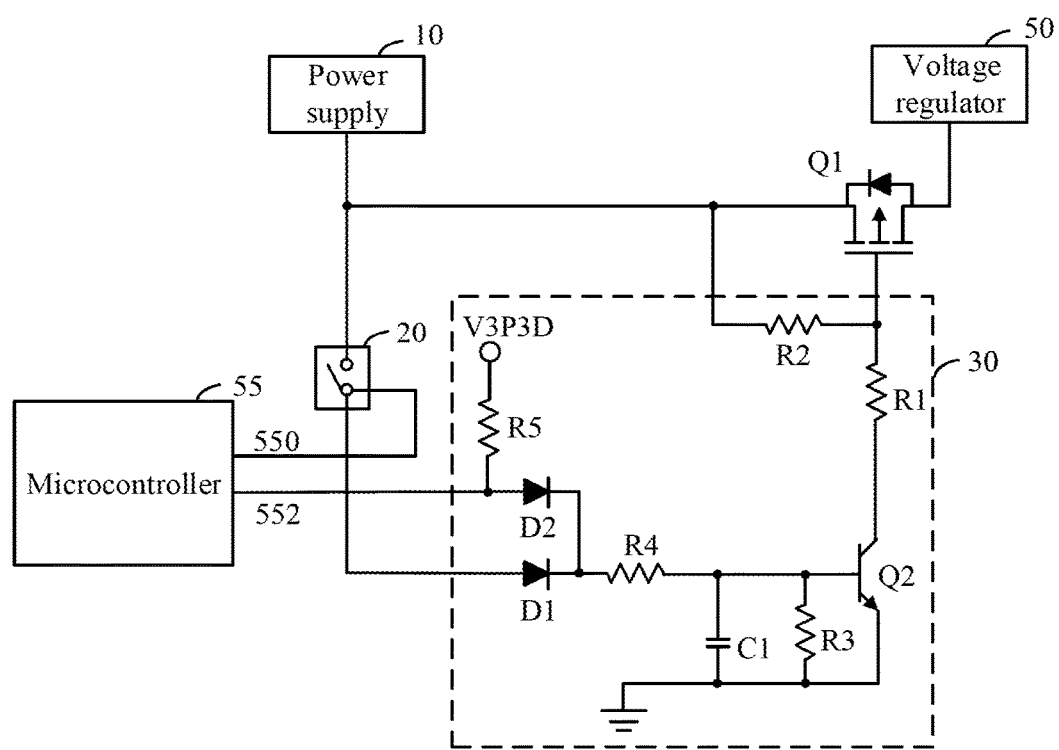
FIG. 5 is a specific circuit diagram of a switch control circuit connected to a microcontroller, a power supply and a voltage regulator as shown in FIG. 4.

FIG. 4 and FIG. 5 show circuit diagrams of a motor drive system according to another embodiment in the present disclosure. Functions and connection relation of the trigger switch 20, the electronic switch 40, the voltage regulator 50, the driver 58, the inverter 60 and the position sensor 80 are similar to those in the above embodiment. The difference from the above embodiment lies that the switch control circuit 30 further includes a diode D2 and a resistor R5. An anode of the diode D2 is connected to a trigger signal pin 552 of the microcontroller 55. The anode of the diode D2 is also connected to a voltage V3P3D through the resistor R5. A cathode of the diode D2 is connected to a cathode of the diode D1.

In the embodiment, the function of cutting off the supply path between the power supply 10 and the voltage regulator 50 when a braking operation of a motor is completed after the trigger switch 20 is turned off is achieved by a program of the microcontroller 55. The microcontroller 55 stores a motor braking program. When the microcontroller 55 operates normally, the trigger signal pin 552 of the microcontroller 55 outputs a high-level signal to the switch control circuit 30. After an external switch pin 550 of the microcontroller 55 receives a signal indicating that the trigger switch 20 is turned off, the microcontroller 55 executes the motor braking program by maintaining the high-level signal at the trigger signal pin 552 and changes the high-level signal to a low-level signal after the braking operation of the motor is completed.

An operating process of the motor drive system according to the embodiment is described below.

Before the trigger switch 20 is pressed, i.e., when the trigger switch 20 is in an off-state, the triode Q2 is in an off-state, a voltage at the node between the resistor R1 and the resistor R2 is equal to a voltage of the power supply 10, the MOSFET Q1 is turned off, no power supply is provided for the voltage regulator 50, and the motor 70 does not operate.

When the trigger switch 20 is pressed, a current provided by the power supply 10 flows through the resistor R4 and the resistor R3, the triode Q2 is turned on when a divided voltage generated by the resistors R3 and R4 reaches a turn-on voltage for the triode Q2, and a current provided by the power supply 10 flows through the resistor R2 and the resistor R1 and generates a voltage drop relative to the power supply 10 at the node between the resistor R2 and the resistor R1. Therefore, the MOSFET Q1 is turned on, and the power supply 10 provides power for the voltage regulator 50 through the MOSFET Q1. As described above, the motor drive system is in operation, and the motor 70 drives, under the drive of the microcontroller 55, a working head of the electric tool to operate. In this case, the microcontroller 55 outputs a high-level signal at its trigger signal pin 552 to the diode D2, and the microcontroller 55 also monitors an operation of the trigger switch 20 in a real-time manner via the external switch pin 550 of the microcontroller 55.

When the trigger switch 20 is turned off, the external switch pin 550 of the microcontroller 55 learns a turn-off action of the trigger switch 20, and the trigger signal pin 552 of the microcontroller 55 keeps outputting the high-level signal and executes the braking program to sends a drive signal to the inverter 60 through the driver 58 to control the motor 70 to perform a braking operation. During the braking operation of the motor, the triode Q2 and the MOSFET Q1 remain in an on-state, that is, the power supply keeps providing power for the voltage regulator 50. When the braking operation of the motor is completed, the trigger signal pin 552 of the microcontroller 55 outputs a low-level signal. Because both the anode of the diode D1 and the anode of the diode D2 receive the low-level signal, both the diode D1 and the diode D2 are turned off, and the triode Q2 is turned off, and then the MOSFET Q1 is turned off, so that the supply path between the power supply 10 and the voltage regulator 50 is turned off, and the motor 70 stops operating.

In the embodiment, a capacitor with a small capacitance value, such as 100 nanofarads, may be selected as the capacitor C1. In the embodiment, a filtering function of the capacitor C1 is mainly applied. When the trigger switch 20 is turned off, a voltage at a base of the triode Q2 may jitter. The capacitor C1 filters out voltage noise generated due to an operation of the trigger switch 20, to avoid misoperation of the triode Q2. The resistor R5 is a pull-up resistor, which stabilizes an output level of the trigger signal pin 552 of the microcontroller 55.

In the above embodiment, a delay time from the trigger switch being turned off to the MOSFET Q1 being turned off is controlled by the microcontroller 55. The microcontroller 55 may also perform other operations during the delay time, such as controlling an LED which is used to indicate a state of the motor, to be turned off after blinking.

Figure 6:
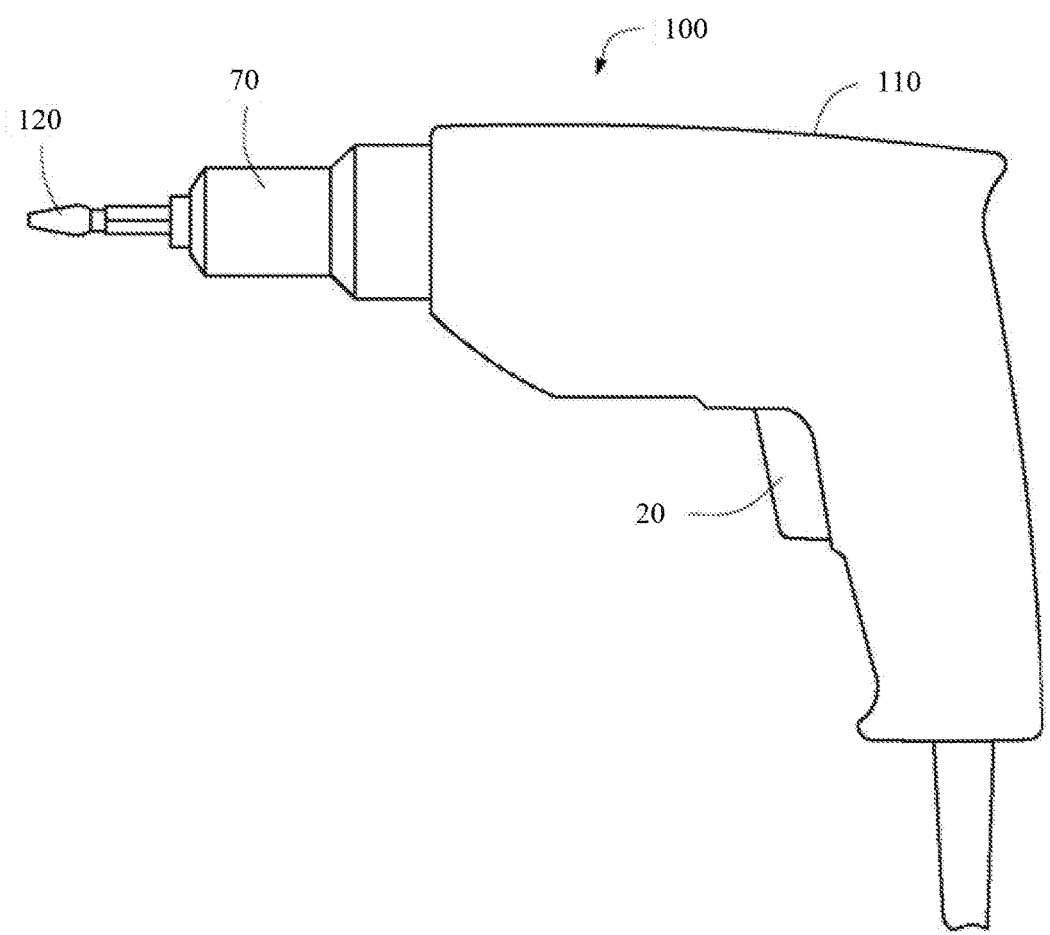
FIG. 6 is a schematic diagram of an electric drill having a motor drive system described above.

FIG. 6 is a schematic diagram of an electric tool, such as an electric drill, using a motor drive system described above. The electric drill 100 includes a housing 110, a working head 120 extending out from the housing, and the motor 70 and the motor drive system as described above which are arranged inside the housing 110. A trigger switch 20 is arranged on a handle at the lower part of the housing 110 and is operable by a user manually, to control the electric tool to be turned on or turned off. The above motor drive system is also applicable to other electric tools, such as an electric screwdriver, a hand mill and an electric saw.

In the above electric tool, since the trigger switch 20 is not connected between the power supply 10 and the inverter 60, a current flowing through the trigger switch 20 is greatly reduced, which may be lower than 20 milliamperes. Hence, a switch having a rated current of 20 milliamperes may be selected as the trigger switch 20, leading to a low cost. In addition, a supply path between the power supply and the voltage regulator may be cut off after delaying for a period of time from a time that the trigger switch is turned off, and a braking operation is completed by the motor during the delay time, which can effectively protect the motor.

The described embodiments are merely preferred embodiments in the present disclosure and are not intended to limit the present disclosure. Various changes, equivalent substitutions and modifications made within the spirit and principle in the present disclosure should fall within the protection scope of the present disclosure. For example, the motor drive system according to the present disclosure is not only applicable to driving a brushless direct current motor, but also applicable to driving other types of motors. Those skilled in the art can understand that, by arranging the trigger switch and the motor in two different current branches respectively with the trigger switch being connected in series to the power supply and with the electronic switch being connected between the power supply and the microcontroller, and by configuring the switch control circuit to control, based on a state including an on-state and an off-state of the trigger switch, a state of the electronic switch, the current flowing through the trigger switch is lower than the operating current of the motor while the motor drive system is powered to operate, and the electronic switch is delayed to be turned off after the trigger switch is turned off, to control the motor to be powered off later than a time that the trigger switch is turned off. In this way, not only an operating state of the electric tool provided with the motor can be controlled by using a cheap low-current trigger switch, but also the motor is ensured to be braked safely.

The invention claimed is:

1. A motor drive system comprising:
an inverter coupled to a power supply comprising a plurality of semiconductor switch elements and configured to convert a voltage provided by the power supply into alternating current power to power an electric motor;
a motor drive control circuit configured to output a drive signal to control a power mode of the semiconductor switch elements in the inverter;
a trigger switch;
a first electronic switch connected between the power supply and the motor drive control circuit, when the first electronic switch is turned on, the power supply supplies power to the motor drive control circuit to drive the electric motor; and
a switch control circuit comprising a second electronic switch, a control terminal of the second electronic switch coupled to the trigger switch and a first terminal of the second electronic switch coupled to a control terminal of the first electronic switch, the switch control circuit configured to turn on or turn off the first electronic switch based on a state of the trigger switch.

2. The motor drive system according to claim 1, wherein the switch control circuit further comprises a delay unit connected between a control terminal of the second electronic switch and the trigger switch and configured to delay to turn off the first electronic switch for a delay time since the trigger switch is turned off.

3. The motor drive system according to claim 2, wherein the motor drive control circuit comprises a microcontroller configured to detect the state of the trigger switch and control the motor to brake during the delay time.

4. The motor drive system according to claim 2, wherein the switch control circuit further comprises a diode, a cathode of the diode is coupled to the control terminal of the second electronic switch through the delay unit, an anode of the diode is coupled to the power supply through the trigger switch, the first terminal of the second electronic switch is coupled to the control terminal of the first electronic switch through a first resistor, the control terminal of the first electronic switch is coupled to the power supply through a second resistor, a first terminal of the first electronic switch is coupled to the power supply, a second terminal of the first electronic switch is coupled to the motor drive control circuit, and the control terminal of the second electronic switch is coupled to the second terminal of the second electronic switch through a third resistor.

5. The motor drive system according to claim 4, wherein the delay unit comprises a capacitor and a fourth resistor, the fourth resistor is connected between the cathode of the diode and the control terminal of the second electronic switch, and the capacitor is connected between the cathode of the diode and ground.

6. The motor drive system according to claim 1, wherein a rated current of the trigger switch is lower than 100 milliamperes.

7. A motor drive system comprising a trigger switch, a first electronic switch, and a switch control circuit, wherein
the trigger switch is connected in series to a power supply;
the first electronic switch is configured to control a motor to be powered on or powered off; and
the switch control circuit comprises a second electronic switch, a control terminal of the second electronic switch coupled to the trigger switch and a first terminal of the second electronic switch coupled to a control terminal of the first electronic switch, the switch control circuit is configured to control the first electronic switch based on a state of the trigger switch, wherein the first electronic switch is delayed to be turned off after the trigger switch is turned off to control the motor to be powered off later than a time that the trigger switch is turned off.

8. The motor drive system according to claim 7, wherein the trigger switch and the motor are arranged in two different current branches respectively, and a current flowing through the trigger switch is lower than an operating current of the motor while the motor drive system is powered to operate.

9. The motor drive system according to claim 8, wherein the current flowing through the trigger switch is lower than one percent of the operating current of the motor while the motor drive system is powered to operate.

10. The motor drive system according to claim 9, wherein the motor drive system further comprises a microcontroller, and the first electronic switch is connected in series between the power supply and the microcontroller.

11. The motor drive system according to claim 7, wherein the trigger switch is a switch operable by a user manually.

12. An electric tool, comprising a housing, a working head extending out from the housing, a motor for driving the working head, and the motor drive system according to claim 1.

13. The electric tool according to claim 12, wherein the electric tool is one of an electric drill, an electric screwdriver, a hand mill and an electric saw.

14. The motor drive system according to claim 1, wherein the switch control circuit further comprises a delay unit, the delay unit comprises a capacitor and a resistor, the resistor is connected between the trigger switch and the control terminal of the second electronic switch, the control terminal of the second electronic switch is connected to the ground through the resistor and the capacitor in series.

15. The motor drive system according to claim 7, wherein the switch control circuit further comprises a capacitor and a resistor, the resistor is connected between the trigger switch and the control terminal of the second electronic switch, the control terminal of the second electronic switch is connected to the ground through the resistor and the capacitor in series.

* * * * *